(12) United States Patent
Gelbaum et al.

(10) Patent No.: US 9,115,495 B2
(45) Date of Patent: Aug. 25, 2015

(54) REFLECTOR ASSEMBLY FOR A SKYLIGHT CURB AND METHOD OF INSTALLING SAME THROUGH A SAFETY GRID FROM THE ROOF

(71) Applicant: Entech Solar, Inc., Grapevine, TX (US)

(72) Inventors: David Gelbaum, Costa Mesa, CA (US); Robert Walters, Keller, TX (US); Don Spears, The Colony, TX (US)

(73) Assignee: Entech Solar, Inc., Grapevine, TX (US)

( * ) Notice: Subject to any disclaimer, the term of this patent is extended or adjusted under 35 U.S.C. 154(b) by 0 days.

(21) Appl. No.: 14/461,218

(22) Filed: Aug. 15, 2014

(65) Prior Publication Data

US 2015/0047274 A1 Feb. 19, 2015

Related U.S. Application Data

(60) Provisional application No. 61/866,278, filed on Aug. 15, 2013.

(51) Int. Cl.
*E04D 13/03* (2006.01)
*F21S 11/00* (2006.01)
*G02B 7/182* (2006.01)

(52) U.S. Cl.
CPC .......... *E04D 13/033* (2013.01); *E04D 13/0315* (2013.01); *E04D 13/0335* (2013.01); *F21S 11/007* (2013.01); *G02B 7/182* (2013.01)

(58) Field of Classification Search
CPC . E04D 13/03; E04D 13/0315; E04D 13/0305; E04D 13/031; E04D 2013/0345
USPC ............................. 52/200, 202; 49/50, 56, 57
See application file for complete search history.

(56) References Cited

U.S. PATENT DOCUMENTS

| 3,205,351 | A | * | 9/1965 | Walker | 362/490 |
| 3,842,935 | A | * | 10/1974 | Frank | 182/81 |
| 4,185,616 | A | * | 1/1980 | Johnson | 126/652 |
| 6,035,593 | A | * | 3/2000 | Chao et al. | 52/200 |
| 6,363,667 | B2 | | 4/2002 | O'Neill | |
| 7,146,768 | B2 | * | 12/2006 | Rillie | 52/200 |
| 7,676,927 | B2 | * | 3/2010 | Van Gelder | 29/897.32 |
| 2001/0013207 | A1 | * | 8/2001 | O'Neill | 52/200 |

* cited by examiner

*Primary Examiner* — Brian Glessner
*Assistant Examiner* — Adam Barlow
(74) *Attorney, Agent, or Firm* — Duane Morris LLP

(57) ABSTRACT

The disclosed subject matter is a reflector assembly for a skylight curb and the method of installing same through a safety grid from the roof. The purpose of the disclosed subject matter is to improve the optical performance of skylight curbs. The reflector assembly is manufacture from metallized polymer film, trimmed to match the desired interior curb surface where it will be mounted, and equipped with attachment devices to facilitate installation. The reflector assembly is configured by folding or rolling into a compact shape, passing it through an opening in the safety grid, unfolding it, and securing it in its proper position using the integrated attachment devices.

14 Claims, 6 Drawing Sheets

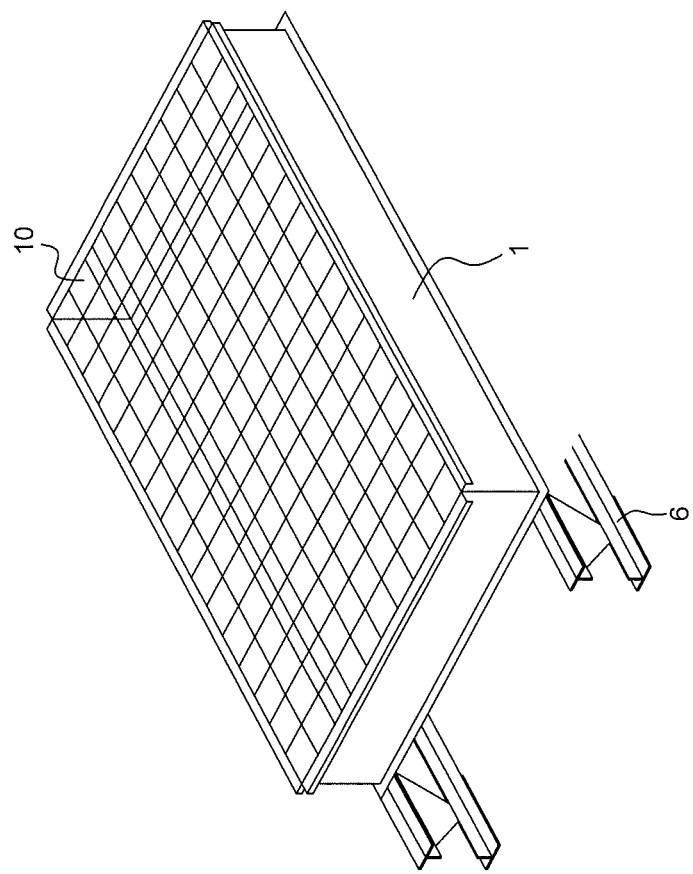
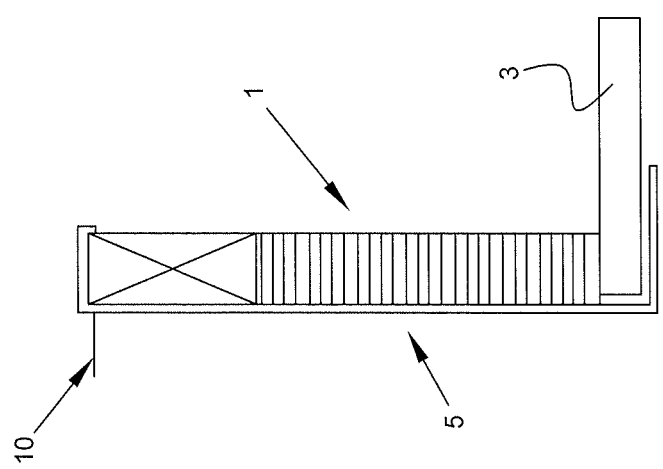
FIG. 2
Prior Art

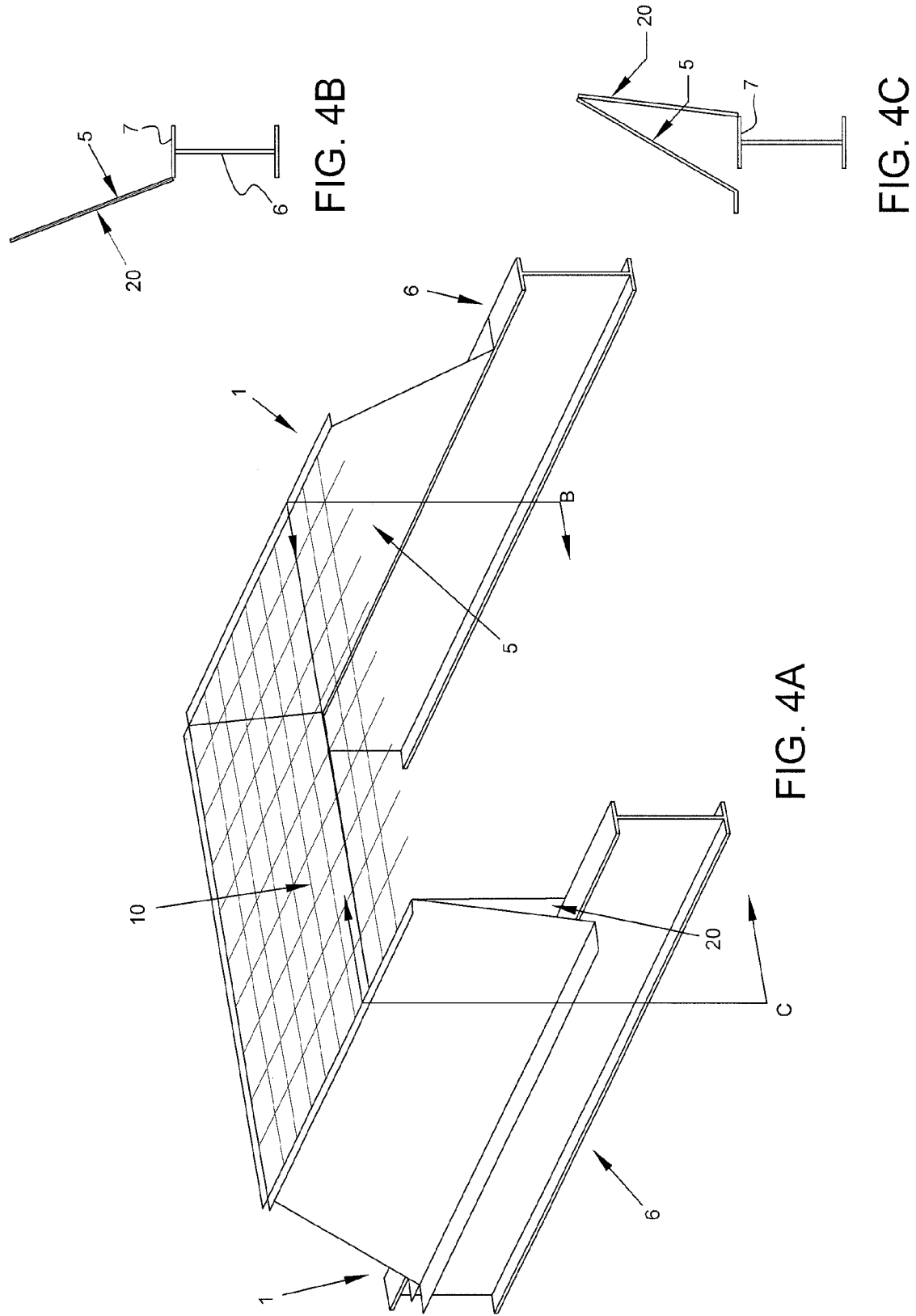

REFLECTOR ASSEMBLY FOR A SKYLIGHT CURB AND METHOD OF INSTALLING SAME THROUGH A SAFETY GRID FROM THE ROOF

CROSS REFERENCES

This application is a non-provisional of and claims priority benefit of U.S. Provisional Application No. 61/866,278, entitled "REFLECTOR ASSEMBLY FOR A SKYLIGHT CURB AND METHOD OF INSTALLING SAME THROUGH A SAFETY GRID FROM THE ROOF", filed 15 Aug. 2013, the entirety of which is incorporated herein by reference.

BACKGROUND

Conventional skylights are generally mounted to structures known as curbs which are attached to the roof of a building and provide a vertical extension upwards to minimize water infiltration into the skylights during heavy rains or heavy snowfall conditions. These curbs are generally painted white on their inner surfaces to partially reflect the sunlight that hits these curbs in an attempt to recover a portion of the light losses which are caused by these curbs. However, since white paint is a diffuse reflector, almost half of the light that is reflected from the curb surfaces goes upward rather than downward into the building to be illuminated by the skylight. So conventional curbs are inefficient optical devices for use with skylights to provide natural daylighting for the building below the curbs.

A partially specular reflector, such as aluminized polyester film, placed on the interior surface of the curb, would alleviate a significant portion of the light losses due to the diffuse white curb surface. However, such partially specular reflector surfaces are relatively delicate and could be easily damaged during shipping and installation of the curb. For example, many structural curbs are welded to the joists that support the roof of the building during installation, and the hot debris from welding would damage or destroy the delicate partially specular reflector surface is this surface was present during curb installation. Similarly, painting of the ceiling inside the building during construction could cause overspray onto the partially specular reflector surface, degrading its optical performance. An ideal solution to this problem would be a partially specular reflector assembly that could be easily installed from the roof after the curbs were welded in place and after the interior ceiling of the building had been painted. However, most curbs are installed with welded safety grids near the top of the curb to prevent personnel injuries from falling through the open curb into the building below.

These welded safety grids generally have small openings on the order of 6 inches by 6 inches in size. The interior curb surfaces are generally several feet long by more than 1 foot tall, and a partially specular reflector of this size would not fit through the small openings in the safety grid, necessitating installation from below, which is problematic. Installation from below requires personnel lifts to roof level, and tight working conditions inside the curb. The lifts would need to be moved from skylight to skylight over the entire building, moreover merchandise, equipment, etc. may need to be relocated, and thus labor time and cost would therefore be high for this approach.

Fortunately, the subject matter disclosed herein solves the problem of installing specular reflector assemblies from the roof even when a safety grid with small openings is present near the top of the curb.

SUMMARY

The disclosed subject matter uses a flexible partially specular reflective material such as aluminized polyester film. The amount of specularity (mirror-like reflection as opposed to diffuse reflection as from white paint) can be controlled by controlling the optical smoothness of the polyester film surface prior to deposition of aluminum on the polyester film. One such well known polyester film is DuPont Mylar® film, which can be procured in different surface roughness conditions from optically smooth to matte finish. Since polyester film is mechanically strong, very thin films of 0.002 inches or less can be used to minimize material costs. The film is easily aluminized and the aluminum surface can be further protected by over-coating it with a clear transparent lacquer such as acrylic material. The aluminized polyester film can be readily trimmed to final shape to match the interior curb surface to which it will be attached. Attachment devices can be integrated into the trimmed reflector assembly to facilitate rapid installation. Finally, the film can be folded or rolled into a compact form so that the maximum dimension of the cross section is smaller than the opening dimension of the safety grid, thereby enabling the reflector assembly to be passed through the grid from the roof to the interior of the curb. Once under the grid, the reflector assembly can be unrolled or unfolded into its original flat shape and attached to the interior of the curb using the attachment devices, which can take many forms well known in the art, such as magnets to stick to the steel curb, pressure sensitive adhesive to bond to the curb surfaces, hooks to hang from the safety grid, screws or pins to insert into the curb surfaces, etc.

The advantages of the disclosed subject matter have been measured by the inventors using a skylight optical performance test system. Compared to conventional white curb surfaces, the new partially specular reflector assembly provides substantially improved light output, as measured by light sensors inside the working space beneath the skylight. The specular reflectors direct much more of the light downward than the white curb surfaces they replace. Since rays of light coming from the skylight and hitting the curb surface have a downward directional component, the partially specular reflector surfaces conserve this downward directional component, while white diffuse reflector surfaces remove this downward directional component, leading to major losses from upwardly reflecting rays.

The preferred embodiment of the disclosed subject matter also uses an improved geometry for the curb itself, with tilted surfaces that provide beneficial collimation for the rays of light that hit these surfaces. The benefits of collimation are well known in the art of skylights, including, for example, the patented "Passive collimating tubular skylight," U.S. Pat. No. 6,363,667.

The preferred embodiment of the disclosed subject matter furthermore uses multiple versions of the partially specular reflector assembly, with one version attaching to a nearby roof joist rather than to the curb itself, to further improve performance by reducing joist blockage of light.

These and many other advantages of the present subject matter will be readily apparent to one skilled in the art to which the invention pertains from a perusal of the claims, the appended drawings, and the following detailed description of preferred embodiments.

BRIEF DESCRIPTION OF THE DRAWINGS

FIG. 2 presents a perspective view and additional information of a prior art example of a skylight curb which is used with a conventional curb-mounted dome skylight like the one shown in FIG. 1. The curb is generally made of steel for welding to the roof joists which support the roof of the building.

FIG. 3A shows a tapered curb shape with a wider opening at the bottom than at the top of the curb.

FIG. 3A shows the uninstalled reflector assembly, folded into a small package for insertion through the safety grid from the roof. After passing through the safety grid, the reflector assembly is unfolded and attached to the inner surface of the curb beneath the safety grid.

FIG. 4A presents another perspective drawing of the disclosed subject matter, with one side of the curb removed to show the inside details of the curb, including the reflector assembly attached to one inner wall of the curb. FIG. 4A also shows the roof joists beneath the curb and the safety grid near the top of the curb. As shown, the reflector assembly covers essentially all of the interior or inner surface of the curb from just below the safety grid at the top to the lower edge of the curb at the bottom.

FIG. 4B shows cross section B of FIG. 4A where the roof joists top plate meets flush with the curb, the reflector assembly can be terminated at the bottom of the curb.

FIG. 4C shows a cross section C of FIG. 4A where the roof joist beneath the skylight curb blocks a portion of the bottom aperture of the curb, which often occurs in real-world skylight installations, the reflector assembly can be terminated at the inner edge of the joist rather than at the bottom of the curb. By so positioning the reflector assembly, blockage of light by the joist is minimized.

DETAILED DESCRIPTION AND BEST MODE OF IMPLEMENTATION

Figure 1:
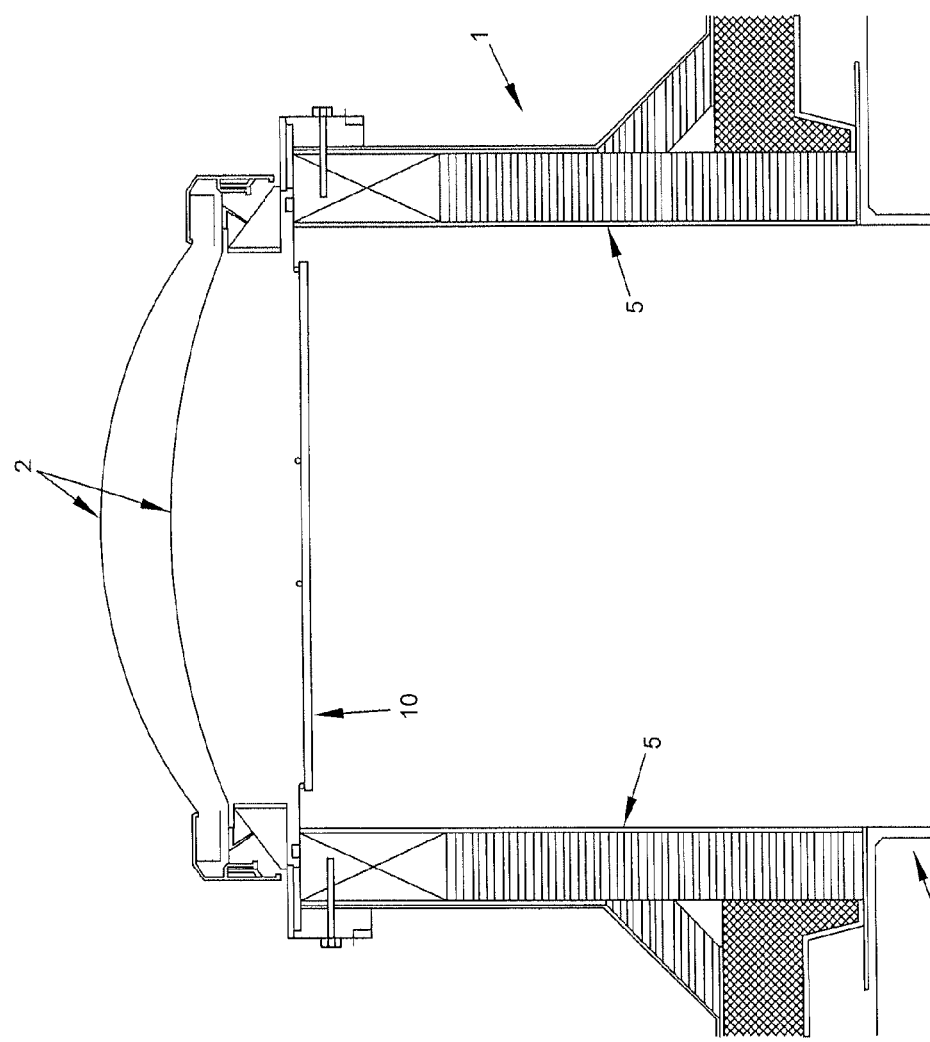
FIG. 1 presents a cross-sectional view of a prior art example of a conventional curb-mounted dome skylight. The inner surface of the curb is generally painted with flat white paint, as shown in FIG. 1.

The disclosed subject matter is best understood by referring to the attached drawings. Referring first to FIG. 1, an example of the prior art widely used for curb-mounted skylights is shown in cross-sectional view. The skylight dome which collects the sunlight can have different numbers of glazing layers, but this example shows two plastic domes, which is a common construction. The plastic dome has an aluminum periphery made from aluminum extrusions, which are installed on top of a steel curb 1. A safety security grid 10 is integrated into the curb 1 near the top of the curb 1. This steel grid prevents workers on the roof from falling into the building through the skylight, or through the curb 1 before the skylight is installed. The is welded or rests on a roof joist 6. The curb 1 generally includes foam insulation in its walls to minimize heat transfer from the outside environment to the interior of the building. The exposed inner surfaces 5 of the curb 1 are generally painted flat white, to partially recover the portion of sunlight from the dome 2 that hits the curb. The skylight dome 2 is generally secured in place with screws that penetrate a wooden nailer at the top of the curb. The construction shown in FIG. 1 is widely used in common "big box" stores such as WalMart SuperCenters, Home Depot home stores, Lowe's home stores, etc. However, this construction has several significant shortcomings which the disclosed subject matter is designed to overcome. The height of the curb 1 is generally at least 18 inches, to keep roof rainwater runoff from reaching up to the dome periphery under heavy downpours, and to keep heavy snowfall from surrounding the dome periphery, where leaks into the building might occur. Therefore the inside surface area of the curb 1 is relatively large. For example, for a skylight dome 2 that is 5 feet wide by 6 feet long, the inside curb 1 area can be 33 square feet or larger. This large curb 1 area can intercept a significant portion of the sunlight captured by the dome 2, thereby reducing the amount of light delivered into the building. Even with white paint on the curb 1, less than half of the sunlight that hits the curb 1 will be delivered into the building, since more than half of the diffusely reflected light will be either directed upward into the dome 2, or delivered sideways onto the other sides of the curb, or absorbed by the curb. A primary objective of the disclosed subject matter is to mitigate this major loss of light by a conventional skylight curb.

Referring next to FIG. 2, an example of the prior art widely used for skylight curbs is shown in perspective view, cross-sectional view, with tabular details. The curb 1 is made of steel which can be directly welded to the roof joists 6 which support the roof of a building. This is also an example of the curbs used on "big box" stores, including WalMart SuperCenters, Home Depot home stores, etc. The curbs are generally equipped with safety grids 10 near the top of the curb 1 to prevent personnel falls into the building through the curb 1 during construction, or through the skylight after installation. The roof deck 3 often sits directly on the bottom ledge of the curb 1 as shown in FIG. 2. The inner surfaces 5 of the curb 1, as well as the safety grid 10, are often painted flat white to recover some of the sunlight that hits these structures as useful light inside the building. A primary objective of the disclosed subject matter is to improve the optical performance of skylight curbs similar to the one shown in FIG. 2.

Figure 3A:
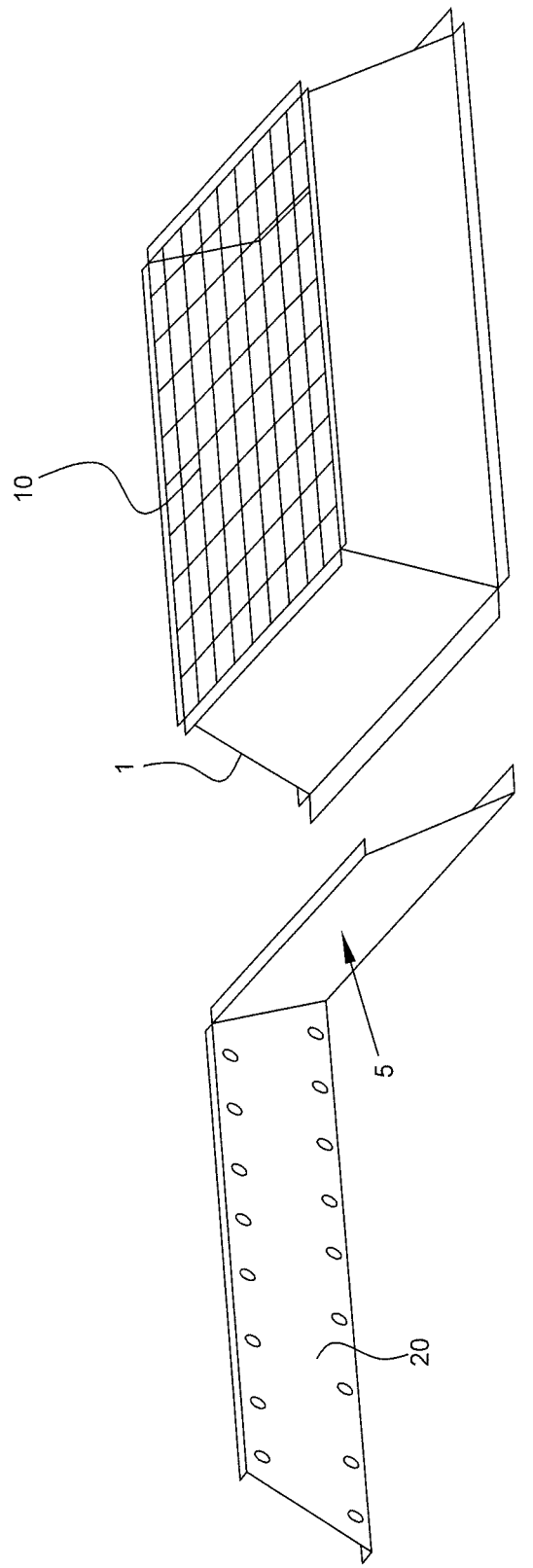
FIG. 3A presents perspective and cut-away views of the curb with the reflector installed according to an embodiment of the disclosed subject matter.

Referring next to FIG. 3A, the principal elements of the disclosed subject matter are shown in perspective view, including a cut-away view for clarity. To improve the performance of skylight curbs, the disclosed subject matter comprises a partially specular (mirror-like) reflector assembly 20 which is installed on the inner surfaces 5 of the curb 1 to more efficiently reflect light into the building compared to the inefficient conventional diffuse reflectors (white paint) normally used on these inner curb surfaces 5. FIG. 3A shows the reflector 20 installed adjacent to the inner surface 5 of the curb 1 where the reflector 20 has yet to be installed. To enable installation of the new reflector assemblies after the curbs with safety grids have been installed, the reflector assemblies 20 are made of flexible material, such as aluminized polyester film, which can be folded or rolled (or otherwise configured) into a small package that will fit through the openings of the safety grid 10. Another feature of the disclosed subject matter is also shown in FIG. 3, slanted walls on the curb. By slanting the walls to create a larger exit aperture at the bottom of the curb 1 compared to a smaller entrance aperture at the top of the curb, a collimating effect if obtained for sunlight rays which hit the curb 1 and are reflected by the partially specular reflector assembly. The optical benefits of collimation for skylights are well known in the art, including, for example, U.S. Pat. No. 6,363,667. Sunlight from the skylight dome that hits the tilted partially specular reflector assembly will be redirected more vertically downward than the incident ray.

Figure 3B:
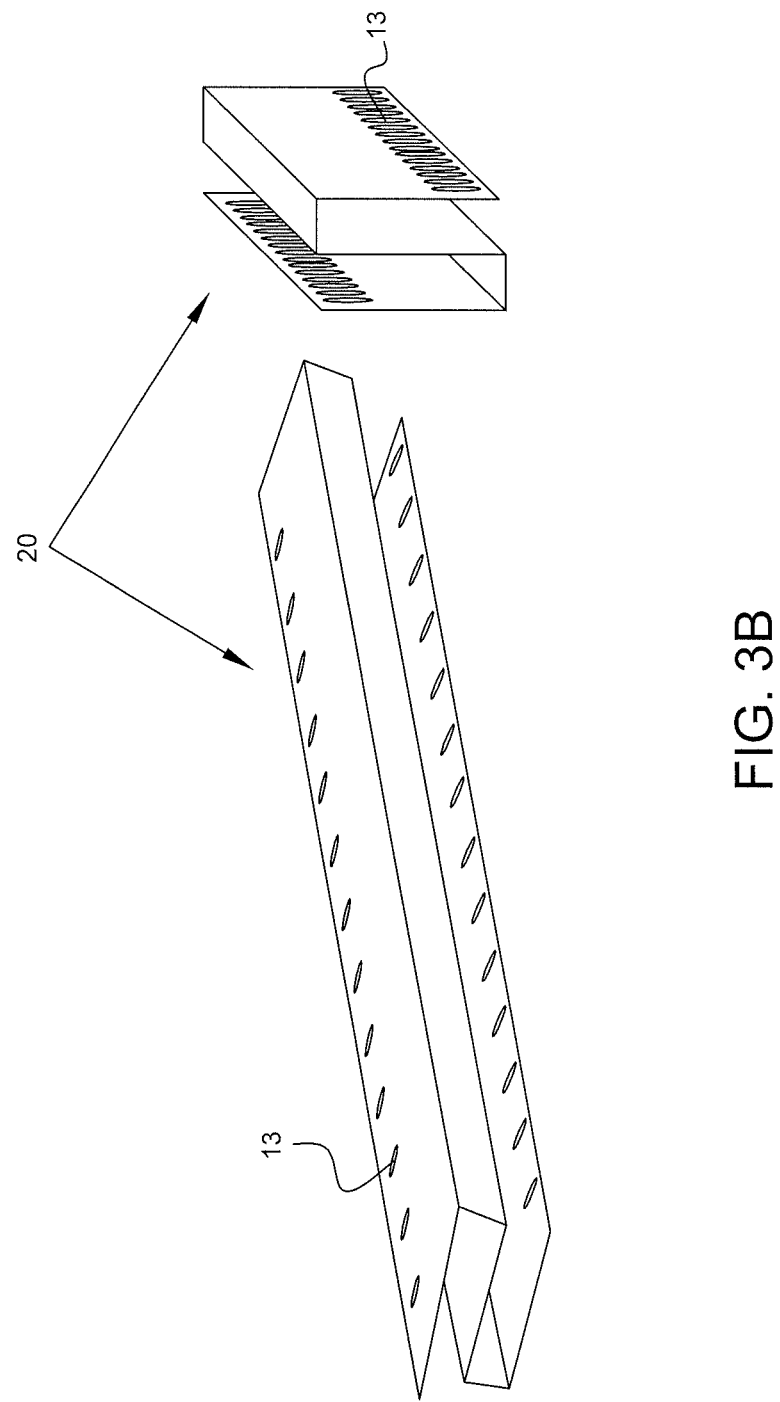
FIG. 3B presents an embodiment of the novel reflector assembly for use on the inner surfaces of a skylight curb like the one shown in FIG. 3A.

FIG. 3B shows an example folded reflector assembly being passed through one such opening in the safety grid. FIG. 3 also shows that the reflector assembly includes integrated attachment devices 13 which can take many forms, from magnet to stick to the steel curb 1 to pressure sensitive adhesive strips to bond to the curb, to hooks to attach to the safety grid, to mechanical fasteners such as screws, pins, or rivets, or to many other forms well known in the art of mechanical fasteners.

FIGS. 3A and 3B shows one preferred embodiment of the disclosed subject matter, comprising flexible partially specular reflector assemblies 20, which can be folded or rolled into a small package, then passed through the opening of the safety grid 10, and finally installed on the inner surfaces 5 of the curb 1 using integral attachment devices 13.

The reflector assembly 20 must be configured to fit through the safety grid 10, as such the width of the reflector assembly 20 as configured must be at least less than the diagonal of the grid openings and the thickness relatively small. Naturally, the larger the thickness, the smaller the width must be to facilitate the folded or rolled reflector 20 to pass through the safety grid 10. The reflector assemblies 20 can be made from many different materials, but the presently preferred material is aluminized polyester film, with a protective transparent lacquer, such as acrylic, over the aluminum to minimize corrosion. The installation of the reflector assemblies 20 can be done completely from the roof, without interior building access to the skylight, minimizing labor time and cost, and reducing hazards to workers who would otherwise need to perform the installation on tall lifts inside the building.

The operation of the disclosed subject matter is also clear from FIG. 3. Light that enters the top opening of the curb 1 from the skylight dome can either go directly through the bottom opening of the curb 1 into the building or be reflected by the partially specular reflector assemblies 20 into the building. This optical operation of the disclosed subject matter avoids the major losses of light from conventional diffuse (white painted) curb 1 surfaces.

Referring next to FIG. 4A, a perspective view of the disclosed subject matter, a partially specular reflector assembly 20, is shown installed on a curb 1 which is mounted to roof joists 6 below. To make the reflector assembly easier to view, one side of the curb 1 has been removed. The preferred tilted curb 1 geometry is shown in FIG. 4A, since this geometry provides an additional optical benefit, namely, collimation of sunlight rays that hit the reflector assembly 20 installed on the tilted curb inner surface 5. The safety grid 10 is shown in its usual position near the top of the curb. Note that one edge of the curb 1 is aligned with the roof joist 6 below as shown in more detail in FIG. 4B, but the other edge of the curb 1 is located beyond the roof joist 6 and extends into the interior of the light passage generally defined by the curb 1, a common problem for curb installations in large buildings which often have variations in spacing between roof joists over different portions of the building, as shown in more detail in FIG. 4C. While one preferred location for the reflector assembly is shown on two of the three curb 1 walls in FIG. 4A to be from the top of the curb 1 just below the safety grid 10 to the bottom of the curb in FIG. 4B, an alternate location for the reflector assembly is also shown on the third curb 1 wall in FIG. 4A as shown in FIG. 4C. This alternate location is from the top of the curb 1 just below the safety grid 10 to the top or top plate 7 of the roof joist 6 that would otherwise block light from reaching the interior of the building. By adding the reflector assembly 20 in this alternate location, light that would otherwise hit the roof joist's top plate 7 is instead redirected into the building, improving skylight optical performance and luminance levels within the building. The skylight dome 2 previously shown in FIG. 1 is not shown in FIG. 4, to allow the details of the curb 1 and the disclosed subject matter to be better viewed.

The operation of the disclosed subject matter is clear from FIG. 4A. Light that enters the curb 1 from the skylight dome above has two principal paths into the building, directly through the lower aperture of the curb 1 or indirectly after reflecting off of the partially specular reflector assemblies 20 attached to the curb 1 walls. Light that reflects off the tilted reflector assemblies 20 is also collimated by having its reflected rays leave with a more vertically downward direction than the incident rays. In comparison to the conventional curbs shown previously in FIGS. 1 and 2 with their white painted interior curb 1 surfaces, the new partially specular reflector assemblies 20 substantially improve the optical performance of the skylight and curb 1 system, providing significantly more useful light beneath the skylight inside the building. This improved performance allows the skylights to be fewer in number or smaller in size for the same illumination levels inside the building, thereby saving not only skylight cost but also building energy usage for heating and cooling, since fewer or smaller skylights have reduced energy exchange with the outside environment.

In summary, FIGS. 4B and 4C show two versions of the partially specular reflector assembly, the first installed principally to the inside curb wall (inner surface 5), and the second installed between the inside curb 1 wall near the top of the curb 1 and the top of the nearby roof joist 6 just below the curb. Other versions of the partially specular reflector assembly will become apparent to those of ordinary skill in the art as this disclosed subject matter is implemented into a variety of buildings, and all of these versions are considered within the scope and spirit of the new invention. In FIGS. 4A-C, the roof joist are shows as I beams, however the disclosures subject matter is equally applicable to roof joists being square, T, C, or box beams as well as dimensional lumber joists or the many types of trusses in common use.

In summary, operation of the disclosed subject matter is clear from FIGS. 4A-C, the partially specular reflector panels attached near the inner surfaces of the skylight curbs improve the optical performance of the skylight system recovering most of the light that would otherwise be lost by hitting the skylight curb. In a preferred embodiment, the curb 1 walls are tilted inward at the top compared to the bottom, thereby also providing the added optical benefit of collimation of rays which reflect from the reflector assembly.

Figure 5:
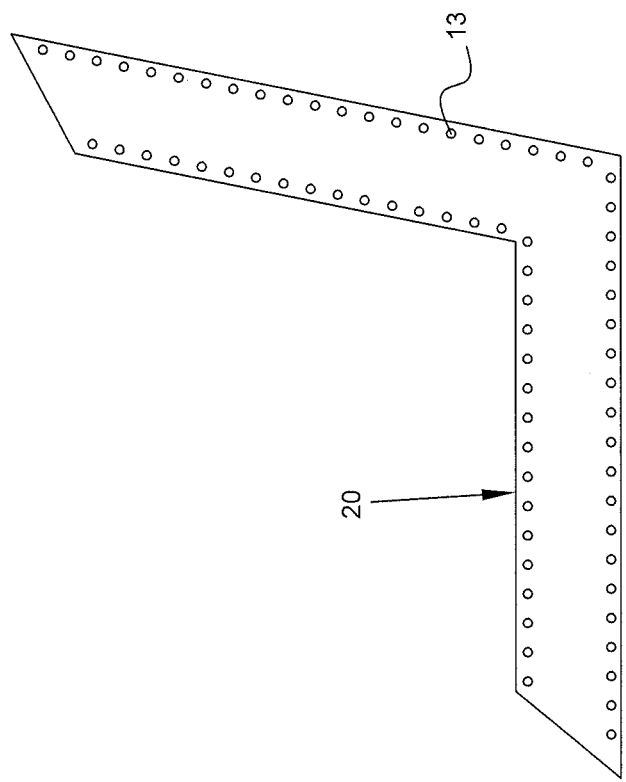
FIG. 5 presents a plan-form view of an exemplary reflector assembly as manufactured in the factory. The shape of the reflector assembly matches the inner surface shape of the curb to which it will be attached, in this case two trapezoidal shapes connected. Attachment devices are also integrated into the reflector assembly near its top and bottom edges, and elsewhere if needed.

Referring next to FIG. 5, an important element of the disclosed subject matter, the partially specular reflector assembly 20, is shown in flat form, as manufactured in the factory, in this case for two inner surfaces, and as shown in FIG. 3B, in folded-up form to enable the reflector assembly to pass through a relatively small opening in the safety grid 10 on top of a skylight curb, so that the reflector assembly can be installed on the inside surfaces of the curb 1 beneath the safety grid 10. The reflector assembly may comprise a separate piece, or separate pieces for each inner surface 5, or be for multiple inner surfaces as shown in FIG. 5. The preferred material comprising the reflector assembly is metallized polymer film, specifically aluminized polyester film, sometimes called aluminized Mylar®. This material is very strong and can be used in very thin sheets, typically 0.002 inches in thickness or less. The material can be easily trimmed to the appropriate shape to fit onto the inner surface of a skylight curb, such as the trapezoidal shape shown previously in FIG.

6 to fit onto the tilted curb 1 shown in FIG. 4. During manufacture, the reflector assembly is also equipped with attachment devices 13 shown in FIG. 5 near the top and bottom edges of the reflector assembly. These attachment devices 13 can take many forms, including magnets for sticking to the steel walls of the curb 1 or the steel top of the roof joists shown in FIG. 4. The attachment devices can alternatively be strips of double-sided pressure sensitive adhesive, such as the mounting tape used for attaching posters and pictures to walls or other surfaces. The attachment devices 13 can alternatively be mechanical in nature, such as grommets and hooks for attaching to the safety grid, screws, pins, or rivets for attaching to holes in the curb 1 walls, clips for attaching to the curb 1 walls or to the roof joists 6, etc. These and many other mechanical attachment devices are well known in the art, and can be readily used to facilitate installation of the reflector assembly 20 near the inner surfaces 5 of a skylight curb 1 beneath a safety grid 10.

For shipping and installation, the reflector assembly can be either folded or rolled into a more compact package, as shown in FIG. 3B. A key reason for folding or rolling the reflector assembly into a small package is to enable the reflector assembly to be passed through the relatively small openings in a normal safety grid. Typically, these openings are on the order of 6 inches by 6 inches in size. As long as the maximum cross-sectional dimensions of the folded or rolled reflector assembly are smaller than the dimensions of the safety grid 10 opening, the package can be passed through the safety grid 10 for installation beneath the safety grid. For example, where the reflector assembly need only be folded once and thus have a relatively small thickness, the width of the compacted reflector assembly 20 need only be smaller than the largest diagonal of the grid openings; where the reflector assembly 20 is rolled up, its radius only need be smaller than the smallest dimension of the grid 10; where the compacted reflector assembly 20 is folded many times, the thickness need be smaller than the smallest dimension of the grid opening and the width need be smaller than the largest dimension of the grid opening. In situation where the grids forms other shapes appropriate consideration should likewise be taken when compacting the reflector assembly 20 to fit through the safety grid 10.

For installation, after the reflector assembly has passed through the safety grid, the package is unfolded or unrolled, and then attached to the proper inner surfaces of the curb 1 and/or the nearby roof joists, as previously shown in FIGS. 4A-C. For ease in handling during the safety grid pass-through operation, the folded or rolled up reflector assembly can have strings or wires or other devices attached to the folded or rolled up reflector assembly. Many different methods of implementing the reflector assembly installation will become apparent to those of ordinary skill in the art using the new flexible, folded or rolled reflector assembly.

The passage of the reflector assembly through the safety grid is critical because of the reasons for not installing it in the factory where the curb 1 is manufactured. The reason is that the partially specular reflector surface is relatively fragile. During shipping and installation, damage to this reflector 20 is very likely, especially during curb 1 welding to the joists supporting the roof of the building. Hot debris from the welding process could easily burn or melt the aluminized polyester film, which is the preferred material because of its low cost, high mechanical strength, light weight, and wide availability. Similarly, painting of the interior ceiling in the building will generally involve overspray of the paint which could coat the reflector material, rendering it optically ineffective as a partially specular reflector. Therefore, the most appropriate time for installing the reflector assembly 20 is after the curb 1 has been installed on the building and after the ceiling has been painted inside the building. But prior to the disclosed subject matter, installing reflector assemblies 20 inside skylight curbs would have required the work to be performed inside the building by personnel on high lifts, since the safety grid 10 would preclude access to the inner curb 1 surfaces from the roof. The disclosed subject matter overcomes this problem by allowing all work to be performed from the roof, which is safer, quicker, and much less costly than from the interior of the building. Furthermore, if the building is occupied, as for example by a WalMart SuperCenter with rows of shelves with products and workers and customers beneath the skylights, interior access to the skylights may be impossible. But the disclosed subject matter allows the reflector assemblies 20 to be installed from the roof by merely removing the skylight dome, passing the reflector assembly 20 through the safety grid 10, and using the integrated attachment devices 13 to position and secure the reflector assemblies 20 in their proper locations near the inner walls of the curb 1. Clearly, the disclosed subject matter allows retrofit installation of partially specular reflector assemblies 20 on previously installed skylights originally equipped with conventional white-painted inefficient curb walls. So even currently inefficient curbs can be improved without access to the interior of the building on which the skylights are installed.

An aspect of the disclosed subject matter comprises flexible, partially specular reflector assemblies 20, each of which can be folded or rolled into a compact package, then passed through the relatively small opening of a safety grid 10, and finally efficiently installed using integrated attachment devices 13. The preferred embodiment of the reflector assembly 20 comprises flexible metallized polymer film, specifically aluminized polyester, trimmed to a shape to match the final location inside the skylight curb, and equipped with integrated attachment devices. A novel means of installing the reflector assembly 20 comprises folding or rolling the assembly into a tight package with cross-sectional dimensions small enough to fit through an opening in the safety grid 10, typically 6 inches by 6 inches in size. The folded or rolled reflector assembly package is passed through the safety grid 10, then unfolded under the grid 10 and attached near the inner surfaces 5 of the curb 1 by using the integrated attachment devices 13 to secure the reflector assembly 20 in its desired position.

The disclosed subject matter, including the preferred embodiment described above, and the many other embodiments which can be conceived by those of ordinary skill in the art, offers many advantages over prior art skylight curbs, including improved optical performance and higher illumination levels inside the building beneath the skylight. The disclosed subject matter is completely installable from the roof, for either new or retrofit construction, providing substantial safety, time, and cost advantages over installation methods requiring interior access and personnel lifts.

The optimal configuration of the disclosed subject matter includes a tilted collimating curb 1 with a smaller opening at the top of the curb 1 than at the bottom of the curb. However, the disclosed subject matter can also be used with conventional vertical curbs with the same opening size at the top and bottom of the curb.

For installations where roof joists would otherwise block a portion of the lower opening of the curb, the reflector assembly can be attached to the roof joist to mitigate light blockage by the roof joist, providing yet another benefit over the prior art.

For purposes of the disclosure, the thickness, width and length are overall lengths and not mean to be limited only to rectangular structures. The width may be the diameter of the rolled reflector, or the dimension along the major axis if the rolled reflector is more of an elliptical cross section. Generally, the thickness being the smallest dimension, followed by width and then length. Given a fold in which the cross section resembles a triangle, the thickness may be the shortest leg, and the width may by the longest leg, or alternatively the hypotenuse is the width and the perpendicular line to the opposing vertex may be the thickness. The same is similar with respect to the grid openings, in that the width is generally the smaller dimension followed by the length. The inner dimension of relevance with respect to the grid may be the diagonal, if the thickness of the folded reflector is insignificant, a reflector with a width slightly smaller than the diagonal measurement would likely pass through.

An aspect of the disclosed subject matter is the reflector is partially specular (mirror-like) in its reflective properties, thereby directing more light downward into the building than a conventional white-painted reflector which is diffuse (reflecting in all directions, unlike a mirror). The preferred reflector material is aluminized polyester film, which is strong, lightweight, and easily folded or rolled into a compact package.

Another aspect of the disclosed subject matter is a tapered curb shape with a wider opening at the bottom than at the top of the curb. Combined with the partially specular reflector assembly, this tapered curb provides another optical benefit, collimation of the light which hits the curb, thereby directing more light downwardly as opposed to laterally, improving the illumination within the building below.

Yet another aspect of the disclosed subject matter is the novel approach of folding the reflector assembly into a compact package enables installation of the reflector assembly to be accomplished solely from the roof, after the curb has been installed. This is much more efficient and cost-effective than installation from inside the building, which would require moving personnel lifts from skylight to skylight, with installers working in tight spaces inside the curbs at dangerous vertical distances above the floor of the building, with joists and other steel structures presenting potential points of accidental impact injury to the installers.

While the embodiments discussed in the application have used, for example purposes only, skylights with rectangular geometries, the disclosed subject matter can be adapted to other skylight shapes, including round, hexagonal, octagonal, triangular, etc. The partially specular reflector assemblies 20 can be shaped appropriately for these other skylight geometries, folded or rolled into compact packages, passed through safety grids if present, and installed using integrated attachment devices for any conceivable skylight shape. Similarly, while the embodiments discussed above have used, for example purposes only, skylights with horizontal apertures, the disclosed subject matter can be readily applied to skylights with tilted apertures, such as tilted roof windows. The basic configuration and installation process can be adapted to all forms of skylights, while still falling within the scope and spirit of the present invention. It is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for improving the performance of an installed skylight, wherein the skylight includes a curb defining a light passage having an upper and a lower opening and a safety grid extending over the upper opening; wherein said curb extending upwards from a roof surface and supported by at least one roof joist and said safety grid attached to said curb and defining a plurality of grid openings, said curb further having an interior surrounding the light passage, said the method comprising:
   manufacturing a reflector having a flexible partial specular reflective surface; said reflector sized to substantially match the interior of the curb and direct incident light down, said reflector having an original width and original length, said original width being greater than an inner dimension of the plurality of grid openings;
   providing an attachment mechanisms wherein the attachment mechanisms is configured to retain the reflector on the interior of the curb between the upper and lower openings;
   configuring the reflector by one of folding and rolling such that at least two of the configured width, thickness and length of the configured reflector is less than the inner dimension;
   passing the configured reflector from the upper opening through any one of the plurality of grid openings; and,
   restoring the reflector to the original width and length; and,
   attaching the reflector to the interior of the curb with the attachment mechanism.

2. The method of claim 1, wherein a top plate of the at least one roof joist extends into the interior of the curb, and wherein the reflector forms a planar surface between an upper portion of the interior of the curb and an edge of the top plate.

3. The method of claim 1, wherein a top plate of the at least one roof joist is flush with the interior of the curb and wherein the reflector conforms to the interior of the curb.

4. The method of claim 1, wherein the attachment mechanism comprises magnets affixed to the reflector.

5. The method of claim 1, wherein the attachment mechanism comprises at least one of a pressure sensitive adhesive, screws and pins.

6. The method of claim 1, wherein the attachment mechanism comprises hooks that attach the reflector to the safety grid.

7. The method of claim 1, wherein the configured width comprises a diameter of the rolled reflector.

8. The method of claim 1, wherein the upper opening has an area less than the area of the lower opening.

9. The method of claim 1, wherein the curb comprises four walls defining the interior of the curb, wherein at least one of the walls is inclined from vertical.

10. The system of claim 1, wherein a top plate of the at least one roof joist extends into the interior of the curb, and wherein the curb reflector is configured to attach to an edge of the top plate.

11. The method of claim 1, wherein the curb comprises four walls and wherein at least one of the walls is oblique from vertical.

12. The method of claim 1, wherein the plurality of grid openings are rectangular having an opening length and an opening width, wherein the inner dimension is a function of the opening length and opening width.

13. The system method of claim 12, wherein the function is:
   inner dimension=$\sqrt{(l^2+w^2)}$, where l is the opening length and w is the opening width.

14. The method of claim 1, wherein the flexible partial specular reflective surface is an aluminized polyester film.

* * * * *